No. 693,662. Patented Feb. 18, 1902.
H. S. MAXIM.
PROCESS OF OBTAINING COFFEE SUBSTITUTES.
(Application filed Oct. 15, 1900.)
(No Model.)
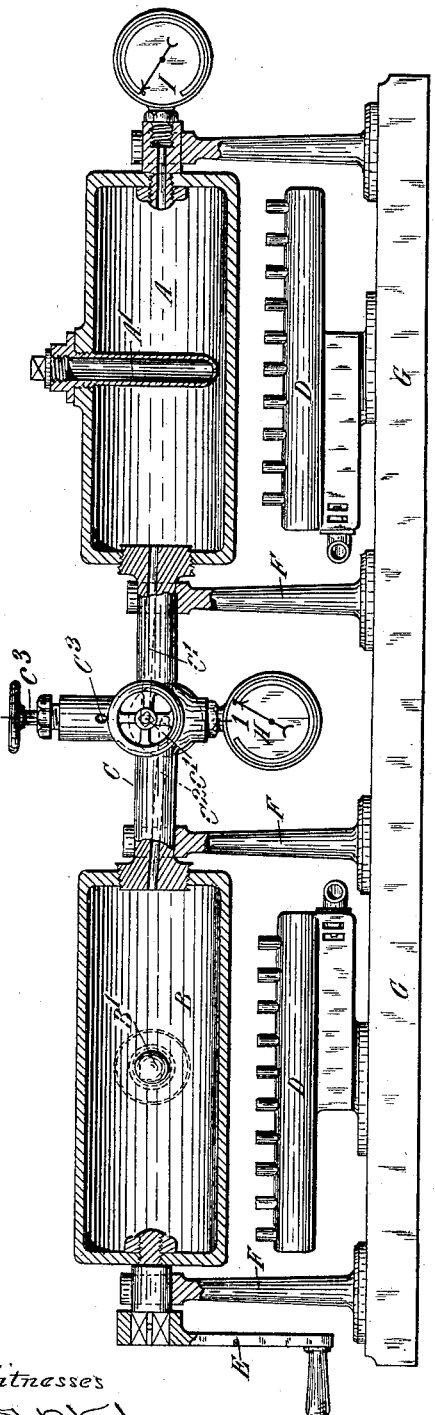
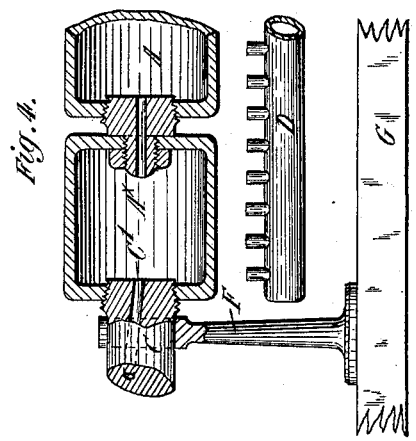
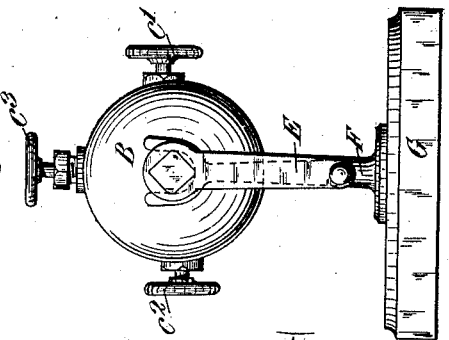
Witnesses
Inventor
Hiram S. Maxim
by James L. Norris
atty

UNITED STATES PATENT OFFICE.

HIRAM STEVENS MAXIM, OF LONDON, ENGLAND.

PROCESS OF OBTAINING COFFEE SUBSTITUTES.

SPECIFICATION forming part of Letters Patent No. 693,662, dated February 18, 1902.

Application filed October 15, 1900. Serial No. 33,121. (No specimens.)

*To all whom it may concern:*

Be it known that I, HIRAM STEVENS MAXIM, chevalier of the Legion of Honor, civil and mechanical engineer, a subject of the Queen of Great Britain, residing at 18 Queens Gate Place, London, in the county of Middlesex, England, have invented certain new and useful Improvements in and Relating to the Treatment of Coffee and the Production of Substitutes Therefor, of which the following is a specification.

This invention has reference to the treatment of coffee and the production of substitutes therefor.

In the roasting or burning of coffee-berries for the purpose of rendering them suitable or palatable for consumption as a beverage many valuable products are driven off in the form of gas or smoke and escape into the atmosphere, thereby being lost.

It is one of the objects of my invention to so effect the roasting or burning of the coffee-berries that these valuable products are prevented from escaping into the atmosphere and are saved, so that they may be employed for the production of a substitute for coffee, as hereinafter explained.

Several kinds of grain—such as American corn, (maize,) wheat, peas, dates, and the like—have been extensively used in the manufacture of so-called "coffee substitutes," and it has been found that when these grains are suitably roasted or slightly burned they only require a flavor of coffee to be added to them to render them very suitable for use as coffee substitutes. Now according to my invention I obtain this addition of the flavor of the coffee to the peas or other grain employed as the coffee substitutes by causing the latter to assume a porous condition, so as to be capable of very readily absorbing the gaseous products given off during the roasting or burning of the coffee-berries, whereby I not only save the loss of such products, but also obtain a very satisfactory coffee substitute possessing in a high degree the aroma and flavor of coffee.

For the purpose of my invention I may employ a rotary chamber or cylinder to contain, say, a hundred pounds of dry peas, maize, or other suitable grain, and during the rotation of said cylinder heat is applied thereto in any suitable manner. Naturally at first a considerable amount of steam or vapor will be produced, and as the heating progresses the steam or vapor will give place to what I may term "visible" gases or smoke, which will continue to be formed until the peas have been roasted or burned to the required extent. When the requisite temperature has been attained and while the gases or smoke are still escaping from the said rotary chamber, the latter is hermetically closed and the contents allowed to cool. This treatment will cause the peas to lose a considerable amount of their weight and to assume an extremely porous condition; but if the peas be exposed to the air or other aeriform fluid it will be found that they will absorb a considerable amount of the air or aeriform fluid and will regain much of their lost weight. So long as the peas are kept in the said hermetically-sealed chamber this absorption will of course not take place. In addition to the aforesaid rotary chamber or cylinder containing the peas I may employ another rotary chamber or cylinder to contain, say, one hundred pounds of coffee-berries, and during the rotation of said cylinder heat is applied thereto in any suitable manner. As in the case of the peas, a considerable quantity of steam or vapor will first be driven off from the coffee-berries, and as the temperature rises the steam or vapor will give place to visible gases or smoke and the characteristic odor of roasting coffee will appear. This cylinder is then hermetically closed and communication established between it and the cylinder containing the porous peas, both cylinders being then preferably rotated together and the heating of the coffee-cylinder being still continued. The gaseous products driven off from the coffee thus enter the cylinder containing the peas, which being in a vacuous condition, owing to the cooling of this cylinder, absorb into their pores the gaseous products of the coffee. After continuing this operation for a sufficient time it is stopped and the cylinders are allowed to cool. Upon opening said cylinders and removing the peas the latter will be found to have become much modified in that they possess many of the valuable properties of the coffee and can be very advantageously employed as a substitute for coffee, or rather as coffee itself, because the flavor, odor, and medicinal properties possessed by the modified peas have all been derived directly from the coffee.

If desired, the coffee-berries and the modified peas may be ground together, which will have the effect of doubling the quantity of the final product, each ounce of which will be nearly as good in quality as an ounce of ordinary coffee.

In some cases it may be necessary in order to obtain the proper flavor and odor to subject the gaseous products driven off from the coffee-berries as aforesaid to a further heating prior to their entry into the cylinder containing the peas, or the flavor may be improved by reheating the peas under pressure after they have absorbed the gaseous products from the coffee-berries. This further heating is for the purpose of obviating what one may term the "raw" taste peculiar to the gaseous products that are first driven off from the coffee-berries at the initial stage of their roasting or burning.

To ascertain the progress of the process and judge of the condition of the contents of the aforesaid cylinders, I may provide them with pockets or test-tubes adapted to be hermetically closed at their outer ends by detachable covers or plugs and serving to contain a number of the peas or berries of the kind under treatment. The peas or berries in the said pockets or test-tubes would then be subjected during the heating operation to approximately the same temperature as that of the grains or berries in the cylinders and could be removed from time to time for inspection without opening the said cylinders.

Although I have mentioned maize, peas, and certain other grain for use as the substitutes for the coffee, I do not confine myself thereto, as any edible substances capable of being treated and of acting in a similar manner will serve my purpose—for instance, caramelized sugar, (burnt sugar,) treacle, chicory, and such like may be employed.

In the accompanying drawings I have illustrated a suitable form of apparatus for carrying my process into operation on a scale such as would be suitable in a hotel or for a dealer in coffee.

Figure 1 is a longitudinal section of the apparatus. Fig. 2 is an end view of the same, and Fig. 3 a cross-section taken approximately on the line 1 1 of Fig. 1. Fig. 4 is a fragmentary longitudinal section of a modified form of the apparatus.

A is the cylindrical chamber within which the coffee-berries are heated. B is the cylindrical chamber within which the material that is to serve as the coffee substitute is heated. These two chambers are connected together coaxially by a coupling-piece C, through which the interior of said chambers can communicate, as hereinafter more fully explained. D D are Bunsen burners located beneath the said chambers A and B for heating them. E is a handle by which rotary motion is imparted to the said chambers.

F F are stands or supports carried by the base G and forked at their upper ends to serve as bearings for the rotary chambers A and B.

The coupling piece C is provided with four passages $C'$, $C^2$, $C^3$, and $C^4$ and is also provided with stop-valves $c'$, $c^2$, and $c^3$, by which these passages can be controlled, the said valves being furnished with screw-spindles extending through stuffing-boxes and terminating at their outer ends in hand-wheels for operating them. A transverse passage $C^5$ connects together the various passages $C'$, $C^2$, $C^3$, and $C^4$. When all the stop-valves are closed, the chambers A and B are isolated from each other and from the atmosphere. By opening either of the valves $c'$ $c^2$ the interior of either of the chambers A B can be placed in communication with a pressure-gage H. By opening both of the said valves $c'$ $c^2$ the interior of said chambers A B can be placed in communication with each other through the passages $C'$ $C^2$ and with the said pressure-gage H. By opening the valve $c^3$ and either or both of the valves $c'$ $c^2$ either or both of the chambers A B can be opened to the atmosphere through the passage $C^3$. I also prefer to provide the chamber A with a pressure-gage I for indicating the pressure therein when the said chamber is isolated from the chamber B, and consequently from the pressure-gage H. $A'$ $B'$ are the pockets or test-tubes, which are closed at their outer ends by detachable screw-caps, so that by placing within the said pockets or test-tubes a quantity of the substances that are being treated in the chambers A B the condition of the substances in the said chambers can be approximately ascertained by removing the said screw-caps and examining the contents of the pockets or test-tubes.

The working of the apparatus is as follows: A suitable quantity of the substance that is to serve as the coffee substitute having been placed into the chamber B and a suitable quantity of coffee-berries having been placed into the chamber A, the valve $c'$ is closed and the valves $c^2$ and $c^3$ are opened, so that the interior of the chamber B is opened to the atmosphere through the passages $C^2$ $C^3$. The chambers are rotated by means of the handle E, while heat is applied to the chamber B by its burner. When visible gases or smoke are seen to escape from the chamber B through the outlet C or the substance in the test-tube of this chamber appears to have become sufficiently heated to attain the aforesaid porosity, the burner for heating this chamber is turned off and the valve $c^2$ is closed, thereby closing communication between the interior of the said chamber B and the atmosphere. The valve $c'$ is then opened, so as to put the chamber A into communication with the atmosphere through the passages $C'$ $C^3$. The chamber A is then heated by means of its burner and at the same time revolved by means of the handle E until visible gases or smoke are seen to escape through the outlet $C^3$ or until it is found on examination of the berries in the test-tube $A'$ that they have been sufficiently heated. Meantime the chamber B has been cooling, and as a consequence the volume of gases or smoke therein has become reduced, so that the substances therein are in a more or less vacuous condition. While the chamber A is still being heated and rotated the valve $c^3$ is shut and the valve $c^2$ opened, so as to open communication between the two chambers A and B through the passages $C'$ $C^2$, the visible gases or smoke being still produced by the continued heating of the chamber A. These gases pass into the chamber B, where they are absorbed by the coffee substitute contained therein, as already explained. When the chambers A and B have cooled sufficiently, they are opened and the contents removed. If it be desired to further heat the gaseous products generated in the chamber A prior to their entry into the chamber B, I may provide an additional chamber $A^\times$, mounted coaxially between the two chambers A and B, as represented in Fig. 4.

What I claim, and desire to secure by Letters Patent of the United States, is—

1. A process of obtaining coffee substitutes, which consists in heating the substance that is to serve as the substitute to a temperature sufficiently high to drive off the contained moisture and cause it to assume a porous condition, keeping the porous substitute isolated from the atmosphere until the admission of the coffee-vapors and afterward admitting thereto the gaseous products derived from coffee-berries, for the purpose specified.

2. A process of obtaining coffee substitutes, which consists in heating a suitable grain to a temperature sufficiently high to drive the contained moisture into the atmosphere and to cause said grain to assume a porous condition, keeping the porous grain isolated from the atmosphere until the admission of the coffee-vapors, and admitting to said porous grain the gaseous products derived from heated coffee-berries, substantially as described.

3. A process of obtaining coffee substitutes which consists in heating a suitable grain to a temperature sufficiently high to drive the contained moisture into the atmosphere and to cause said grain to assume a porous condition, keeping the porous grain isolated from the atmosphere until the admission of the coffee-vapors, and after said porous grain has cooled, admitting thereto the superheated gaseous products derived from roasting coffee-berries substantially as described.

4. A process of obtaining coffee substitutes, which consists in heating a suitable grain to a temperature sufficiently high to drive off the contained moisture into the atmosphere, and to cause said grain to assume a porous condition, keeping the porous grain isolated from the atmosphere until the admission of the coffee-vapors, subsequently withdrawing from the pores of said grain any air which may have unintentionally gained access thereto, and then admitting to said porous grain the gaseous products derived from coffee-berries substantially as described.

In testimony whereof I have hereunto set my hand, in presence of two subscribing witnesses, this 5th day of October, 1900.

HIRAM STEVENS MAXIM.

Witnesses:
THOMAS SELBY WARD,
WALTER J. SKERTEN.